United States Patent [19]

Kagami

[11] Patent Number: 5,113,396
[45] Date of Patent: May 12, 1992

[54] INTERFACE FOR ISDN CHANNELS

[75] Inventor: Naoto Kagami, Yokohama, Japan

[73] Assignee: Canon Kabushiki Kaisha, Tokyo, Japan

[21] Appl. No.: 622,281

[22] Filed: Dec. 6, 1990

Related U.S. Application Data

[62] Division of Ser. No. 192,542, May 11, 1988, abandoned.

[30] Foreign Application Priority Data

May 15, 1987 [JP] Japan .................... 62-118513

[51] Int. Cl.⁵ .................... H04J 3/12; H04M 11/00
[52] U.S. Cl. .................... 370/110.2; 370/110.1; 379/93; 379/100; 358/442
[58] Field of Search .......... 370/79, 110.1, 110.2, 370/110.3; 379/93, 94, 96, 100; 358/425, 442, 443; 340/870.12; 341/144, 155

[56] References Cited

U.S. PATENT DOCUMENTS

| | | | |
|---|---|---|---|
| 4,007,334 | 2/1977 | McDonald | 379/110.1 |
| 4,232,293 | 11/1980 | Harris | 358/443 |
| 4,746,986 | 5/1988 | Tanigawa | 379/100 |
| 4,769,833 | 9/1988 | Farleigh et al. | 379/94 |
| 4,922,484 | 5/1990 | Yoshida et al. | 370/110.1 |
| 4,961,185 | 10/1990 | Sawada | 379/100 |

FOREIGN PATENT DOCUMENTS

| | | | |
|---|---|---|---|
| 0096409 | 12/1983 | European Pat. Off. | |
| 2828583 | 1/1980 | Fed. Rep. of Germany | 379/93 |
| 0077271 | 6/1980 | Japan | 379/93 |
| 2066023A | 7/1981 | United Kingdom | |

OTHER PUBLICATIONS

Nguyen, "CMOS-Technologic für die Telekommunikation", Nachrichten Elektronik & Telematic, vol. 39, No. 3, Mar., 1985.
Hadi, "Technology Evolution Towards Digital Customer Access", Mini-Micro Conference Record, Session 6/1, May, 1984, pp. 1-4.
Intl Pub. No.WO 81/03728, Dec. 24, 1981, Apfel Subscriber Line Audio Processing Circuit Apparatus.

Primary Examiner—Douglas W. Olms
Assistant Examiner—Alpus H. Hsu
Attorney, Agent, or Firm—Fitzpatrick, Cella, Harper & Scinto

[57] ABSTRACT

A line interface for ISDN channels converts an analog signed from an analog communication terminal to digital data and sends the converted digital data to a B-channel of ISDN. The digital data from the B-channel of ISDN is converted to an analog signal and the converted analog signal is then sent to the analog communication terminal.

13 Claims, 4 Drawing Sheets

INTERFACE FOR ISDN CHANNELS

This application is a division of application Ser. No. 07/192,542 filed May 11, 1988, now abandoned.

BACKGROUND OF THE INVENTION

1. Field of the Invention

The present invention relates to a line interface for connecting a communication line with a communication terminal.

2. Related Background Art

A method for connecting a communication terminal to an ISDN (integrated services digital network) has been known as a method for connecting the communication terminal to the communication line. The connection method is recommended by the CCITT as I.460 Series Recommendation. The connecting configuration is shown in FIG. 5.

It comprises a network terminator NT which terminates a subscriber line and a private bus, a terminal adaptor 1 for converting an existing interface to an ISDN user network interface, and a terminal equipment TE2 having an interface of an existing V series or X series. A connecting point of the terminal equipment TE2 and the terminal adaptor 1 is called an R reference point, and a connecting point of the terminal adaptor 1 and the network terminator NT is called a T reference point.

The terminal adaptor 1 has a function to convert a protocol for the terminal equipment TE2 to a protocol for the network terminator NT, a function to convert the protocol for the network terminator NT to the protocol for the terminal equipment TE2, and a function of rate adaption at the points R and T.

In the prior art system, a conventional G3 facsimile machine has an interface to connect to the PSTN (public telephone network) and it is not a subject of the I.460 Series Recommendation. Accordingly, it cannot be connected to the ISDN as it is.

U.S. patent application Ser. No. 151,309 filed on Feb. 1, 1988 relates to an ISDN communication terminal.

SUMMARY OF THE INVENTION

It is an object of the present invention to overcome the problem described above.

It is another object of the present invention to improve a line interface.

It is another object of the present invention to enable connection between a digital line and an analog communication terminal.

It is still another object of the present invention to convert a signal from an analog communication terminal to a signal of a digital line to enable connection between a digital line and the analog communication terminal.

Other objects of the present invention will be apparent from the detailed description of the preferred embodiments.

DETAILED DESCRIPTION OF THE PREFERRED EMBODIMENTS

Figure 1:
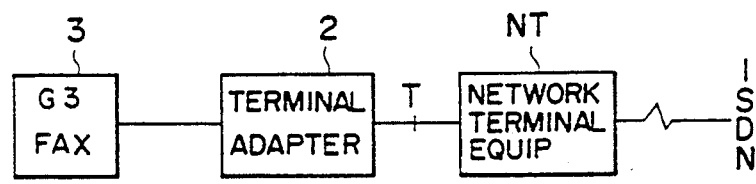
FIG. 1 shows one embodiment of the present invention.

FIG. 1 shows one embodiment of the present invention in which a G3 facsimile machine is connected to a network terminator NT through a terminal adaptor 2.

The G3 facsimile machine 3 is connected to the terminal adaptor 2 through a line connection terminal. The terminal adaptor 2 is connected to the network terminator NT at a reference point T. The network terminator NT is connected to an ISDN (integrated services digital network).

The ISDN line has one control channel (D channel) and two data channels (B channels). A communication control protocol with the line network is conducted through the D channel and data communication is conducted through the B channels.

Figure 2:
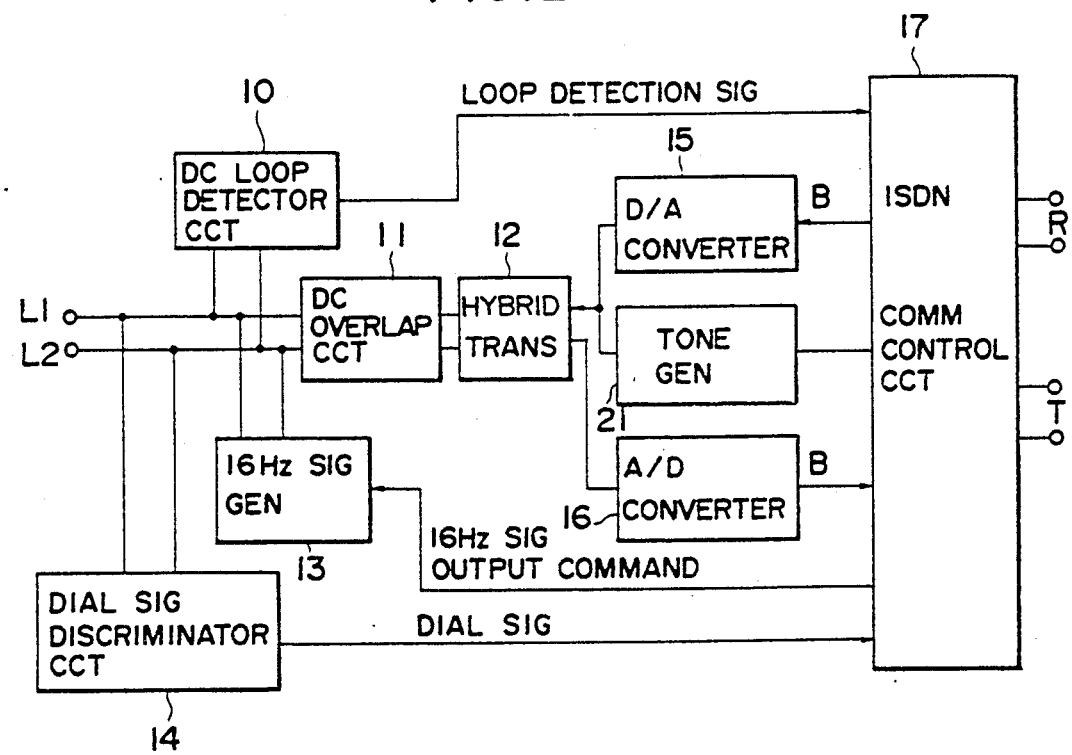
FIG. 2 shows a block diagram of a terminal adaptor 2 of the embodiment.

FIG. 2 shows a block diagram of one embodiment of the terminal adaptor 2 of FIG. 1.

The terminal adaptor 2 comprises a DC loop detector 10 for detecting a DC loop to produce a loop detection signal, a DC superimposition circuit 11 for superimposing (or overlapping) a DC across terminals L1 and L2, a hybrid transformer 12, a 16-Hz generation circuit 13 for generating a 16-Hz calling signal, and a dial signal discriminator for discriminating a dial signal applied to the terminals L1 and L2 to produce a dial signal.

The terminal adaptor 2 further comprises a D/A -converter 15 for converting B channel data received from the ISDN and supplying it to the hybrid transformer 12, an A/D converter 16 for converting the output signal of the hybrid transformer 12, an ISDN communication control circuit 17 for communicating with the ISDN, and a tone signal generator 21 for informing a call of the ISDN.

The loop detection signal is an output of the DC loop detector 10, the 16-Hz send command signal is an output of the ISDN communication control circuit 17, and the dial signal is one discriminated by the dial signal discriminator 14.

The G3 facsimile machine 3 is connected to the terminals L1 and L2 through a metallic cable, and the network terminator NT is connected to the terminals R and T through a metallic cable.

The DC superimposition circuit 11 applies a DC voltage to the line connection terminal of the G3 facsimile machine 3 through the terminals L1 and L2. A DC loop is formed by a line capture operation of the G3 facsimile machine 3. The DC loop detector 10 detects the DC loop and informs it to the ISDN communication control circuit 17, which conducts a start procedure to the network. The dial signal applied to the terminals L1 and L2 by the dial operation of the G3 facsimile machine 3 is discriminated as a dial number by the dial signal discriminator 14 and it is informed to the ISDN communication control circuit 17.

When the ISDN communication control circuit 17 receives the signal from the ISDN, it produces the 16-Hz send command signal and the 16-Hz generator 13 sends the 16-Hz signal to the G3 facsimile machine 3 through the terminals L1 and L2.

The call operation in the present embodiment is explained below.

Figure 3:
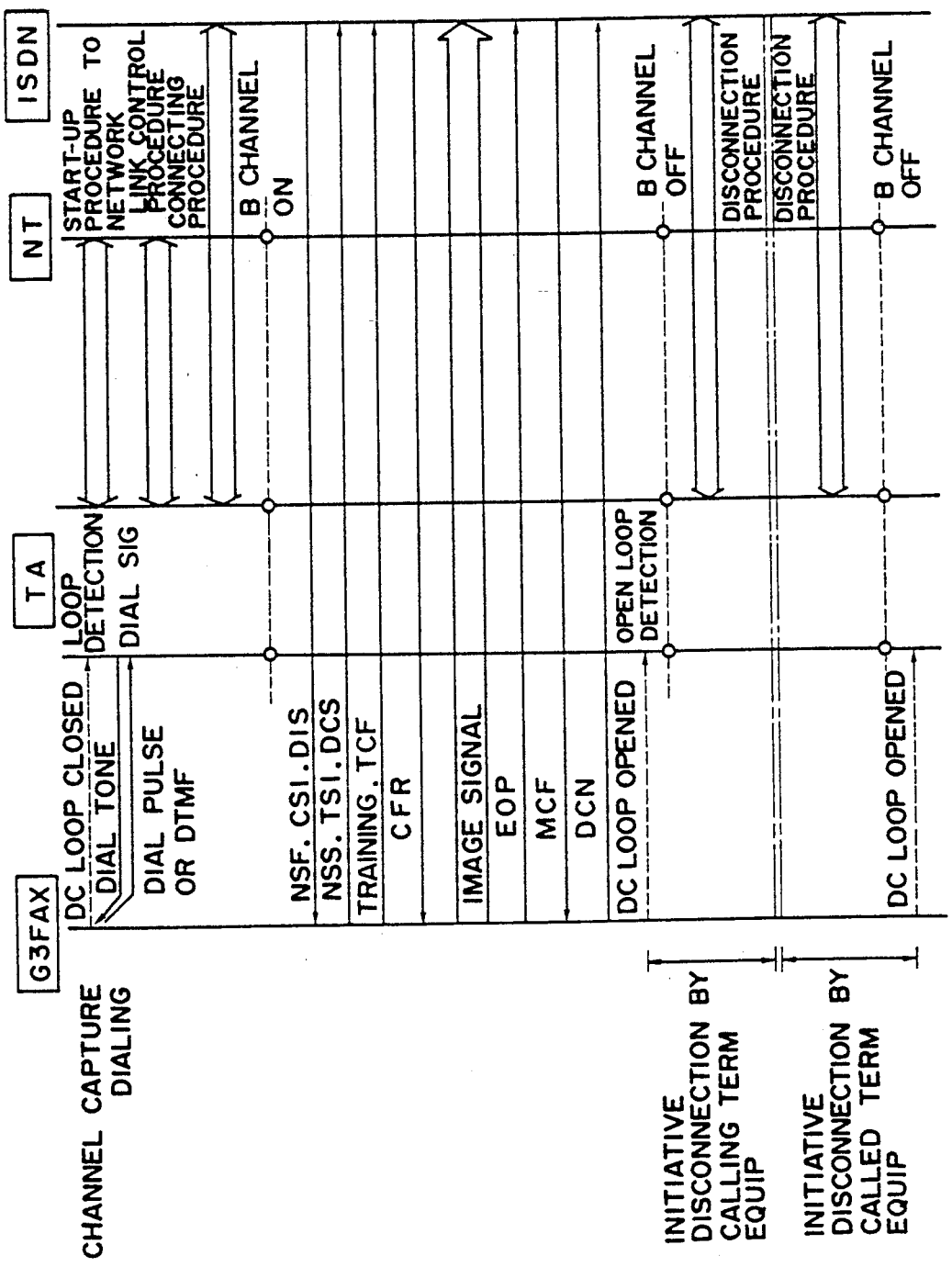
FIG. 3 shows a flow chart of a signal when the terminal adaptor 2 calls.

FIG. 3 shows a flow chart of a signal when the terminal adaptor 2 calls.

First, when the G3 facsimile machine 3 captures the line, a DC loop is formed between the G3 facsimile machine 3 and the terminal adaptor 2. The DC loop detector 10 of the terminal adaptor 2 sends a loop detection signal to the ISDN communication control circuit 17, which executes a network start protocol and the link control protocol to the ISDN. It also sends a dial tone to the G3 facsimile machine 3 by the tone generator 21.

On the other hand, the G3 facsimile machine 3 conducts a dialing operation after the line has been captured and sends a dial pulse or DTMF signal. The dial signal discriminator 14 of the terminal adaptor 2 discriminates it and sends the dial signal to the ISDN communication control circuit 17, which executes the connection procedure to the ISDN and the tone generator 21 sends a ring-back tone or busy tone to inform the call of the ISDN and establishes a communication path to a destination station. In the manner, the B channel of the ISDN is turned on and an end-to-end communication is permitted.

As a result, the CCITT T.30 protocol signals NSF (non-standard facilities), CSI (called station identification) and DIS (digital identification signal) from the G3 facsimile machine 3 of the destination station are received by the ISDN communication control circuit 17 through the B channel, and they are converted to analog signals by the D/A converter 15 and supplied to the G3 facsimile machine 3 through the hybrid transformer 12 and the terminals L1 and L2.

When the G3 facsimile machine 3 receives those signals, it sends the T.30 protocol signal NSS (non-standard facilities set-up), TSI (transmission subscriber identification) and DCS (digital command signal) to the terminal adaptor 2. The signals received by the terminal adaptor 2 through the terminals L1 and L2 are converted to digital signals by the A/D converter 16 through the hybrid transformer 12, and they are supplied to the ISDN communication control circuit 17 and sent to the ISDN through the B channel.

After the B channel has been turned on, transparent transmission of the protocol signal and image signal of the G3 facsimile machine 3 is conducted through the B channel.

After the communication of the G3 facsimile machine 3 through the B channel has been completed, a disconnection protocol where the calling terminal is disconnected earlier or a disconnection protocol where the called terminal is disconnected earlier is executed.

First, it is assumed that the calling terminal is disconnected earlier.

When the communication of the G3 facsimile machine 3 is terminated, the G3 facsimile machine 3 releases the DC loop. When the DC loop detector 10 detects the release of the DC loop, it informs it to the ISDN communication control circuit 17 by the loop detection signal. The ISDN communication control circuit 17 then turns off the B channel and executes the disconnection protocol for the ISDN. As a result, the terminal adaptor 2 is disconnected from the ISDN.

Next, it is assumed that the called terminal is disconnected earlier.

In this case, after the disconnection signal has been received from the ISDN, the disconnection protocol is executed to turn off the B channel. As the B channel is turned off, the B channel reception signal from the network sending to the G3 facsimile machine 3 changes to no signal. When the disconnection signal is received from the ISDN in the course of communication, the G3 facsimile machine 3 detects carrier off and communication is error, when it is received after the communication, the B channel reception signal may change to no signal and the protocol terminates in a normal manner.

A called procedure for the terminal adaptor 2 in the present embodiment is now explained.

Figure 4:
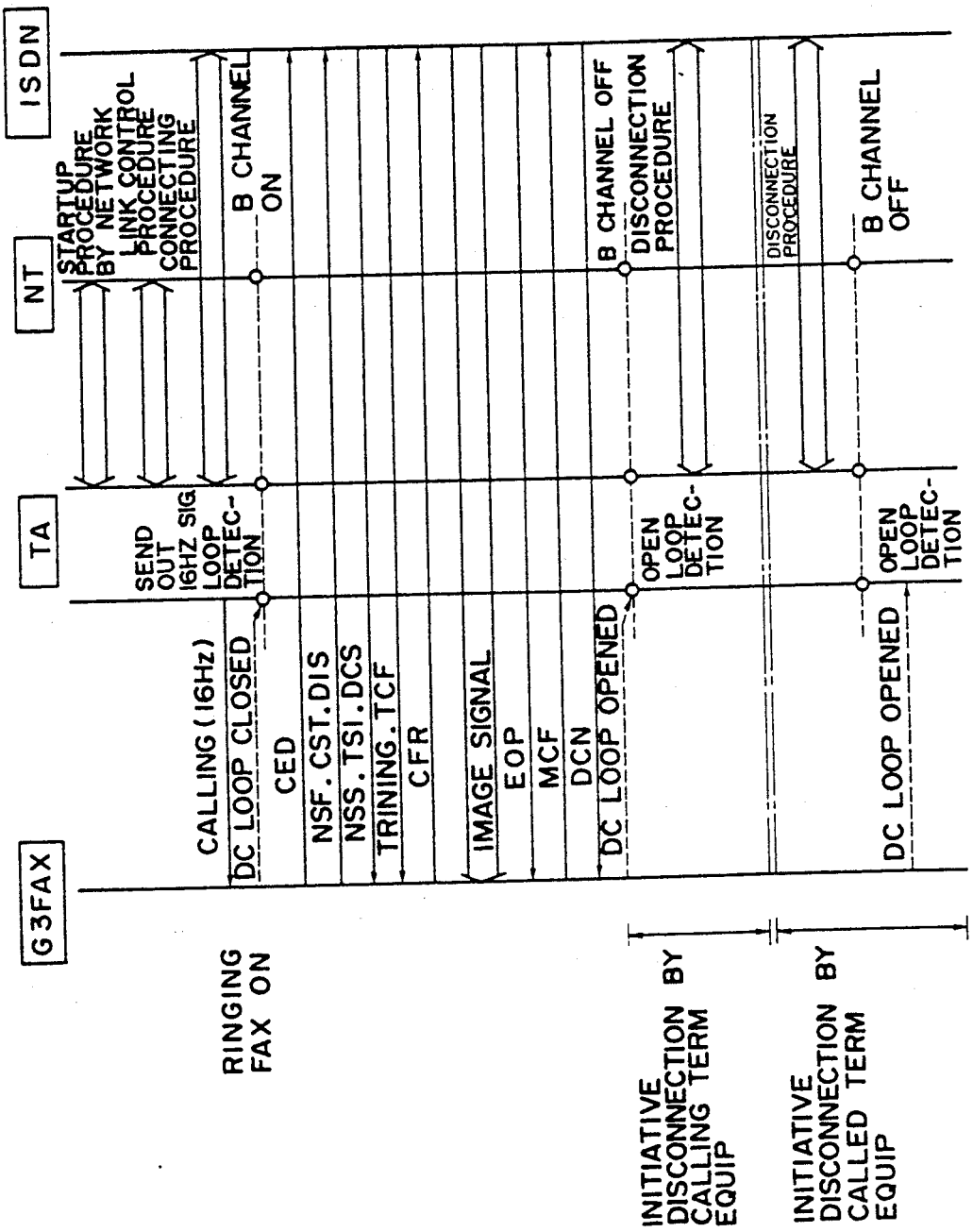
FIG. 4 shows a flow chart of a signal when the terminal adaptor 2 is called.
Figure 5:
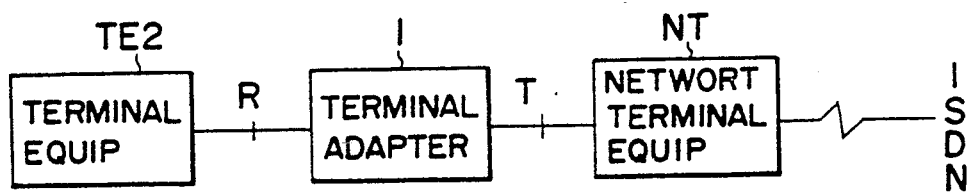
FIG. 5 shows a prior art system.

FIG. 4 shows a flow chart of a signal when the terminal adaptor 2 is called.

First, a start protocol from the network terminator NT is executed so that the terminal adaptor 2 is started. Then, the link control protocol and connection control protocol are executed.

When the terminal adaptor 2 receives the connection control protocol signal, the ISDN communication control circuit 17 sends a 16-Hz send command to the 16-Hz generator 13, which generates the 16-Hz signal which is sent to the G3 facsimile machine 3 through the terminals L1 and L2. When the G3 facsimile machine 3 detects the 16-Hz signal, it captures the line by auto-response or manual response so that a DC loop is established. The DC loop detector 10 detects the DC loop and informs it to the ISDN communication control circuit 17 by the loop detection signal. The ISDN communication control circuit 17 turns on the B channel so that the signal of the G3 facsimile machine 3 is transferred through the B channel as is done in the case where the terminal adaptor 2 calls.

In this manner, the connection to the ISDN is attained without modifying the existing G3 facsimile machine 3 to achieve the mutual communication.

The operation of the terminal adaptor 2 in the disconnection protocol is same as that in the cell operation.

In accordance with the present invention, the connection to the ISDN is attained without modifying the G3 facsimile machine 3 and the mutual communication is achieved.

In the above embodiments, the connection between the G3 facsimile machine and the ISDN has been explained although the present invention is not limited thereto. For example, the present invention is applicable to the connection between an analog communication device such as G2 facsimile machine or G1 facsimile machine and the ISDN.

The connecting line is not limited to the ISDN line but the present invention is applicable to a digital communication line network. In this case, the communication control circuit 17 of FIG. 2 controls the line connection in accordance with the connected digital communication network.

The present invention is not limited to the above embodiments but various modifications may be made.

I claim:

1. An interface for ISDN channels, comprising:
   means for converting an analog signal from an analog communication line connected to an analog communication terminal into digital data and sending the digital data to a B-channel of ISDN;
   means for converting digital data from the B-channel of ISDN into an analog signal and sending the analog signal to said analog communication line;
   means for detecting a DC loop on the analog communication line;
   means for receiving a dial signal from the analog communication terminal; and
   means for controlling connection to the B-channel of ISDN in response to both formation of the DC loop on the analog communication line and the dial signal from the analog communication terminal and for controlling release of the B-channel of ISDN in response to release of the DC loop on the analog communication line.

2. An interface according to claim 1 wherein said control means is for receiving call information from said analog communication terminal and controlling line connection in accordance with the received call information.

3. An interface according to claim 2 wherein said detecting means detects a status of said analog communication terminal, and wherein said control means controls the line connection when a start status of said analog communication terminal indicated by the DC loop is detected by said detecting means.

4. An interface according to claim 1, further comprising means for sending a tone signal to said analog communication terminal wherein said analog communication terminal is informed of ISDN line connection status by the tone signal of the tone signal sending means.

5. An interface according to claim 1 further comprising means for sending a call signal to said analog communication terminal in response to detection of a call from the ISDN channels.

6. An interface for ISDN channels, comprising;
a first terminal for connecting to an analog communication line;
a second terminal for connecting to ISDN channels;
A/D convertor means for converting an analog signal from the analog communication line into digital data and sending the digital data to a B-channel of ISDN;
D/A convertor means for converting digital data from the B-channel of ISDN into an analog signal and sending the analog signal to the analog communication line;
means for detecting a DC loop on the analog communication line;
means for receiving a dial signal from the analog communication line; and
means for controlling connection to the B-channel of ISDN in response to both formation of a DC loop on the analog communication line and the dial signal from the analog communication line and for controlling release from the B-channel of ISDN in response to release of the DC loop on the analog communication line.

7. An interface according to claim 6 wherein:

said receiving means detects call information from the analog communication line connected to said first terminal; and
said controlling means controls connection of the digital line connected to said second terminal in accordance with the detection by said detecting means and said receiving means.

8. An interface according to claim 7, further comprising a tone signal generation circuit which generates a tone signal representing a status of ISDN line connection control by said control circuit and sending the tone signal to the analog communication line.

9. An interface according to claim 6, further comprising a call signal generating circuit for generating a call signal and sending the call signal to the analog communication line, wherein said call signal generating circuit generates the call signal in response to a communication request from ISDN.

10. An interface connected between an analog communication line and ISDN channels, comprising;
means for converting an analog signal from the analog communication line into digital data and sending the digital data to a B-channel of ISDN;
means for converting digital data from the B-channel of ISDN into an analog signal and sending the analog signal to the analog communication line;
first detection means for detecting a loop on the analog communication line;
second detection means for detecting call information from the analog communication line;
means for generating a call signal and sending the call signal to the analog communication line; and
means for controlling connection to the B-channel of ISDN in response to both formation of the loop on the analog communication line and the call information, and for controlling release from the B-channel of ISDN in response to release of the loop on the analog communication line.

11. An interface according to claim 10 further comprising means for generating a tone signal representing a status of line connection control by said control means and sending the tone signal to the analog line.

12. An interface according to claim 2, 3 7 or 10 wherein said call information is dial information.

13. An interface according to claim 4, 8 or 11 wherein said tone signal sending means sends said tone signal indicating the line connection when the line connection control is completed.

* * * * *